(12) United States Patent
Blanck et al.

(10) Patent No.: US 9,080,901 B2
(45) Date of Patent: Jul. 14, 2015

(54) SCREEN UNIT, FACE PLATE UNIT, INDICATOR INSTRUMENT, INDICATOR DEVICE, MOTOR VEHICLE AND METHOD THEREFORE

(71) Applicant: GM GLOBAL TECHNOLOGY OPERATIONS LLC, Detroit, MI (US)

(72) Inventors: Mattias Blanck, Kelkheim (DE); Andrei Kramer, Nierstein (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/028,761

(22) Filed: Sep. 17, 2013

(65) Prior Publication Data

US 2014/0084617 A1    Mar. 27, 2014

(30) Foreign Application Priority Data

Sep. 17, 2012   (DE) .......................... 10 2012 018 259

(51) Int. Cl.
| | | |
|---|---|---|
| *B62D 25/14* | (2006.01) | |
| *G01D 11/26* | (2006.01) | |
| *B60K 37/00* | (2006.01) | |
| *B60K 37/02* | (2006.01) | |
| *G01D 13/02* | (2006.01) | |

(52) U.S. Cl.
CPC ................ *G01D 11/26* (2013.01); *B60K 37/00* (2013.01); *B60K 37/02* (2013.01); *B60Y 2304/072* (2013.01); *B60Y 2410/113* (2013.01); *G01D 13/02* (2013.01); *Y10T 29/49826* (2015.01)

(58) Field of Classification Search
CPC ............. H04M 1/72544; G06F 3/0482; G06F 3/0488; G06F 1/1616; G07F 17/32; E06B 2001/628; E06B 1/70; F25C 5/005; F25D 23/02; B29C 47/0019

USPC .................................. 296/70; 345/156; 701/3
See application file for complete search history.

(56) References Cited

U.S. PATENT DOCUMENTS

| | | | |
|---|---|---|---|
| 560,591 | A | 5/1896 | Lundell |
| 3,706,034 | A | 12/1972 | Sander |

(Continued)

FOREIGN PATENT DOCUMENTS

| | | |
|---|---|---|
| DE | 2515830 A1 | 10/1976 |
| DE | 4227579 A1 | 2/1994 |

(Continued)

OTHER PUBLICATIONS

German Patent Office, German Patent Search Report for Application No. 102012018259.7, dated Aug. 16, 2013.

*Primary Examiner* — Kiran B Patel
(74) *Attorney, Agent, or Firm* — Ingrassia Fisher & Lorenz PC

(57) ABSTRACT

A motor vehicle is provided with an indicator device and to a method for its assembly and/or production. The indicator device includes, but is not limited to an indicator instrument, a face plate unit and a screen unit. The screen unit for covering different indicators that includes, but is not limited to an edge defining an outer contour of the screen unit, and/or the indicator instrument has laterally projecting support extensions for supporting damping elements. The face plate unit includes, but is not limited to an inner portion assigned to the screen unit with a fastening portion. The fastening portion is designed offset from an inner portion. The damping elements are placed onto the support extensions.

1 Claim, 5 Drawing Sheets

(56) References Cited

U.S. PATENT DOCUMENTS

| | | | |
|---|---|---|---|
| 4,095,427 A * | 6/1978 | Stropkay | 60/530 |
| 4,560,083 A | 12/1985 | Danico | |
| 4,939,934 A | 7/1990 | Ritzenthaler et al. | |
| 5,099,396 A * | 3/1992 | Barz et al. | 361/818 |
| 5,238,215 A | 8/1993 | Jeker et al. | |
| 6,119,525 A | 9/2000 | Hamma | |
| 6,476,320 B1 * | 11/2002 | Ritter et al. | 174/66 |
| 6,517,139 B2 * | 2/2003 | Sutou et al. | 296/70 |
| 6,634,693 B2 * | 10/2003 | Straesser, Jr. | 296/70 |
| 6,653,567 B2 * | 11/2003 | Ritter et al. | 174/66 |
| 6,846,031 B2 * | 1/2005 | Pandura | 296/70 |
| 6,994,603 B2 * | 2/2006 | Clark et al. | 440/75 |
| 7,100,959 B1 | 9/2006 | Herrera, Jr. | |
| 8,061,863 B2 * | 11/2011 | Min | 362/97.4 |
| 8,403,390 B2 | 3/2013 | Rich et al. | |
| 2005/0092869 A1 * | 5/2005 | Vandertol | 248/27.1 |
| 2008/0024288 A1 * | 1/2008 | Kageyama et al. | 340/461 |
| 2010/0226712 A1 * | 9/2010 | Kuroki et al. | 403/291 |
| 2013/0214552 A1 * | 8/2013 | Spitler | 296/70 |
| 2014/0125085 A1 * | 5/2014 | Wakibayashi et al. | 296/70 |

FOREIGN PATENT DOCUMENTS

| | | |
|---|---|---|
| DE | 29516383 U1 | 12/1995 |
| DE | 102004038432 A1 | 2/2006 |
| DE | 102007002501 A1 | 7/2008 |
| DE | 202010009010 U1 | 2/2011 |
| DE | 102010011893 A1 | 11/2011 |
| FR | 937683 A | 8/1948 |
| GB | 2063982 A | 6/1981 |
| JP | 07286866 A | 10/1995 |
| JP | H10260065 A | 9/1998 |
| WO | 2011098171 A1 | 8/2011 |

* cited by examiner

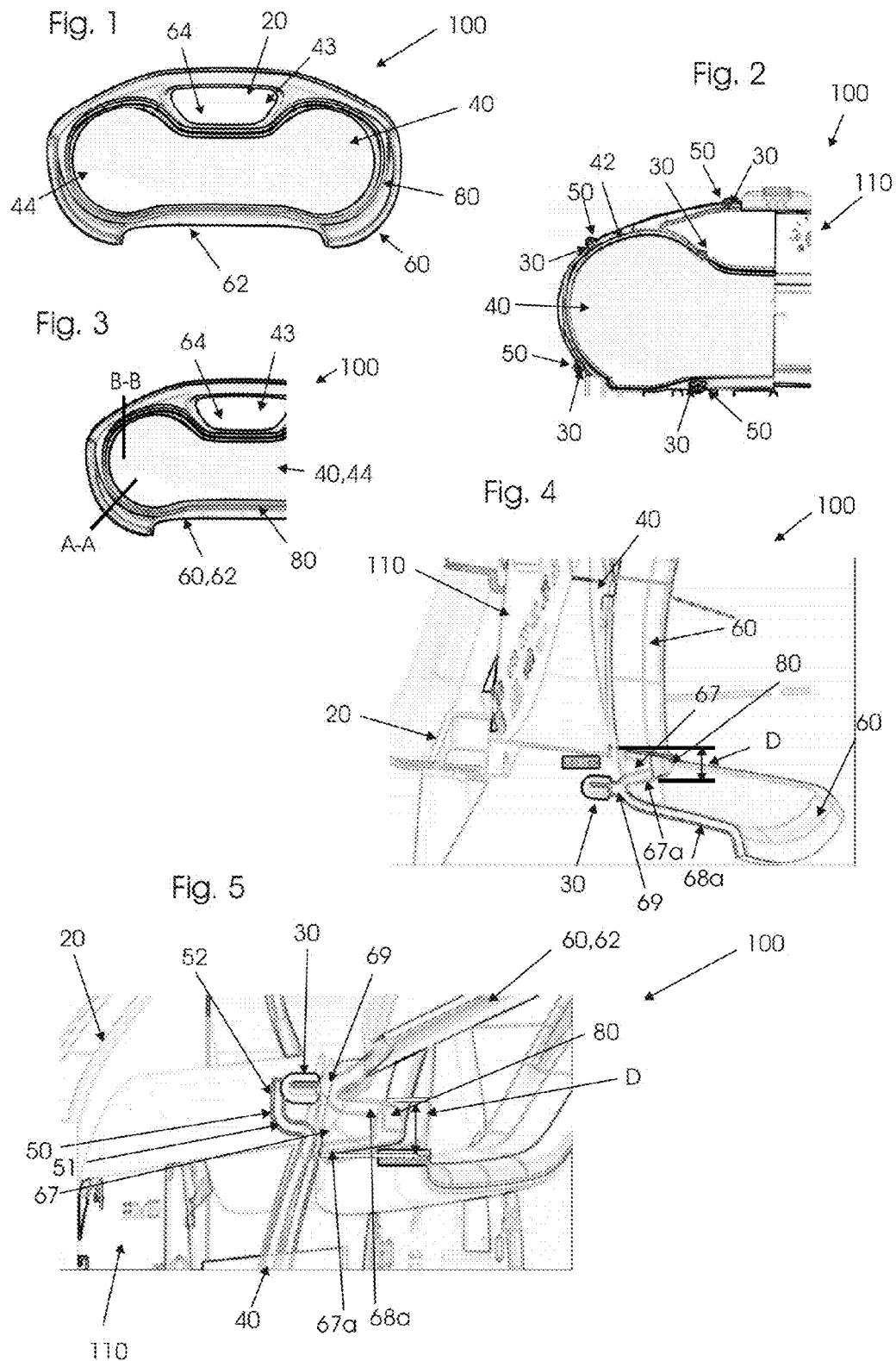

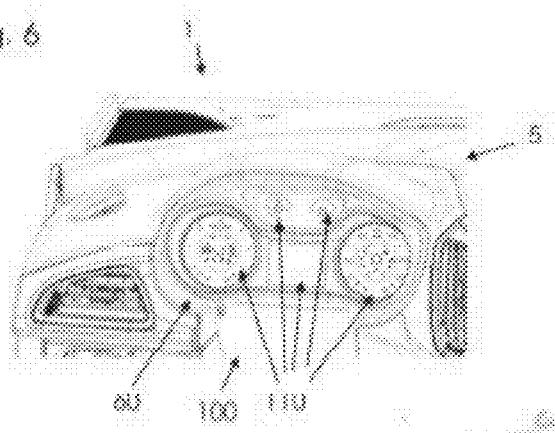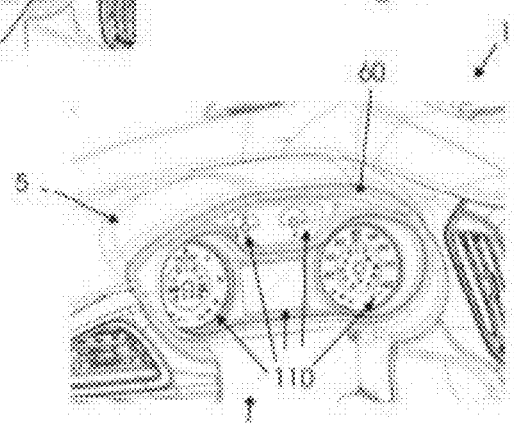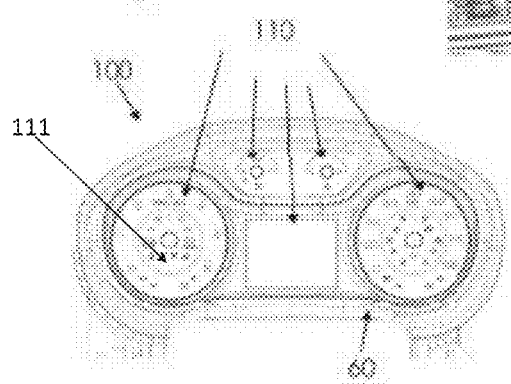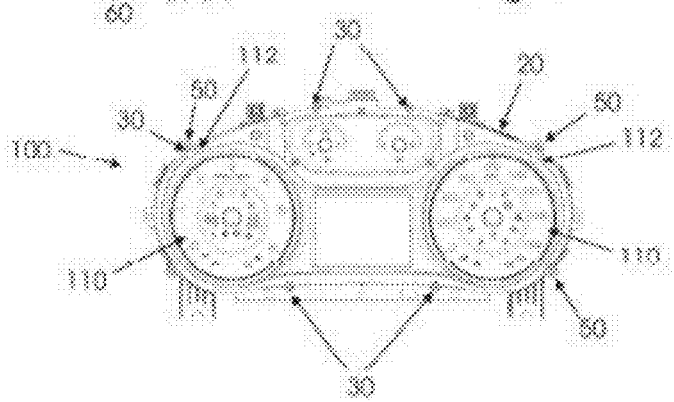

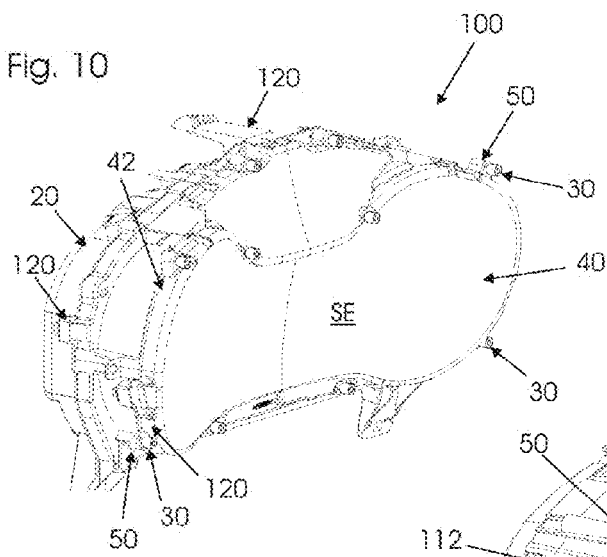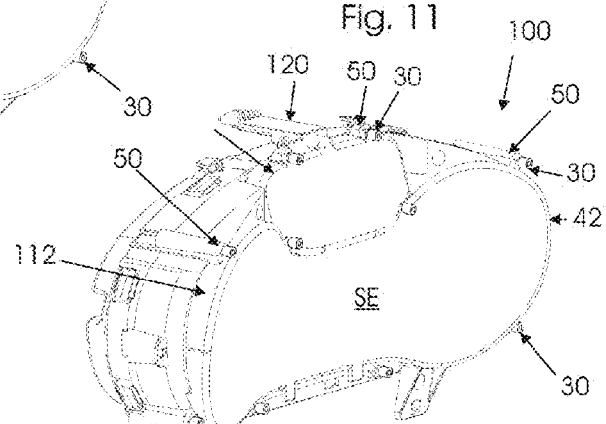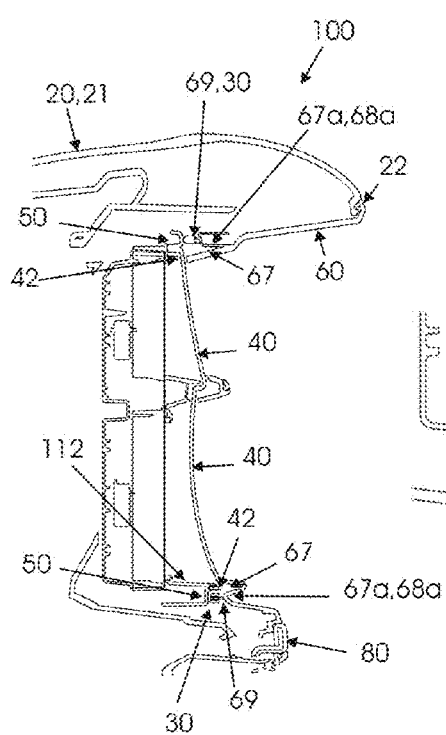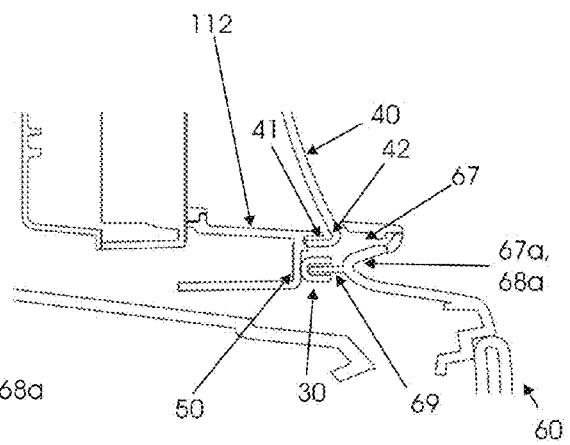

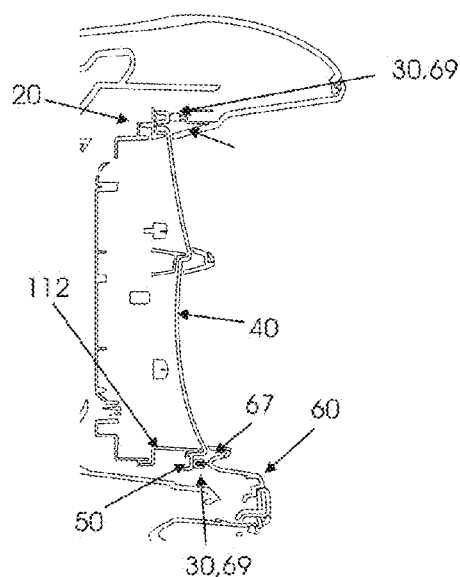
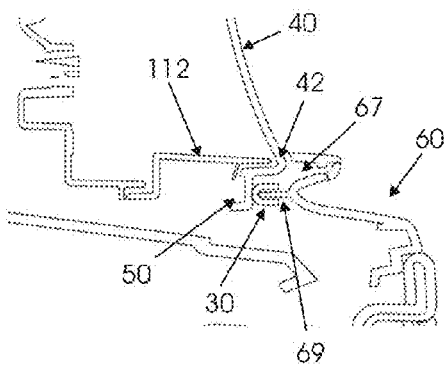
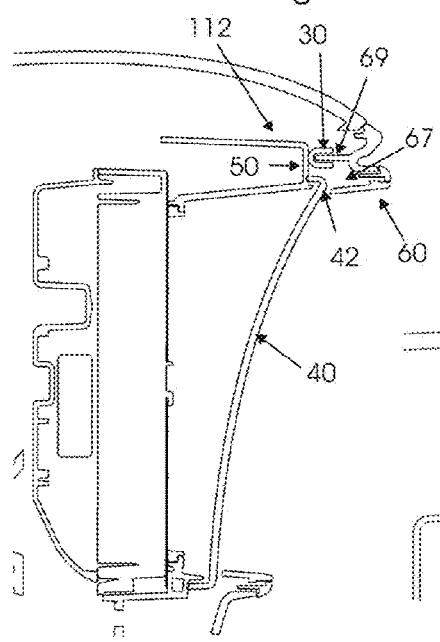
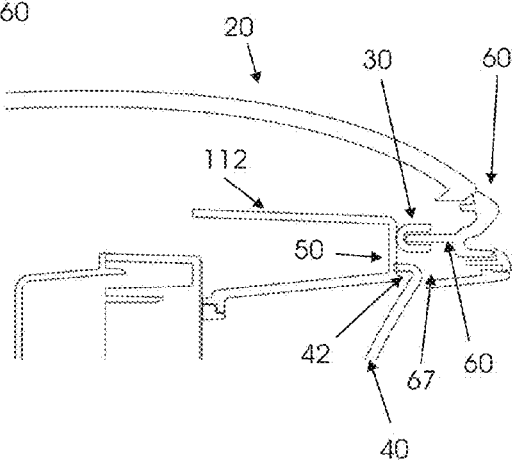

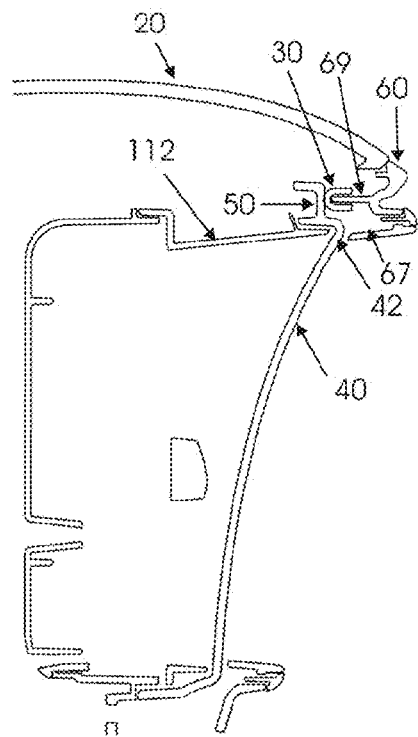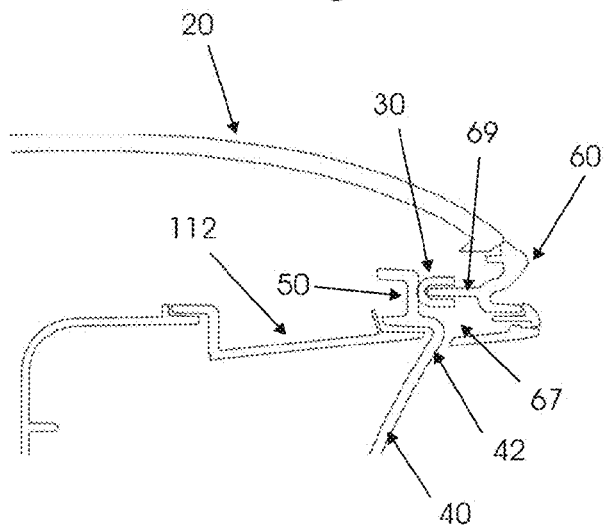

SCREEN UNIT, FACE PLATE UNIT, INDICATOR INSTRUMENT, INDICATOR DEVICE, MOTOR VEHICLE AND METHOD THEREFORE

CROSS-REFERENCE TO RELATED APPLICATION

This application claims priority to German Patent Application No. 10 2012 018 259.7, filed Sep. 17, 2012, which is incorporated herein by reference in its entirety.

TECHNICAL FIELD

The technical field relates to a screen unit for an indicator device for a motor vehicle, a face plate unit for an indicator device for a motor vehicle, an indicator instrument for indicating a drive characteristic of a motor vehicle for arrangement in an indicator console, in particular for a cockpit of a passenger car, an indicator device for a motor vehicle, a motor vehicle, and a method for mounting and/or producing an instrument panel for a motor vehicle.

BACKGROUND

Instrument panels for motor vehicles and corresponding motor vehicles as well as production methods for these are generally known. Here, various indicators for driving speed, on-board computer, rotational speed, tank level and/or other driving-related information indicating units are located in an indicator console. Here, the instrument panel is arranged in a cockpit. The arrangement is made according to ergonomical, technical safety and/or design aspects.

The indicators are or the instrument panel is therefore covered with a screen or another at least partially transparent covering, which is fastened to the indicator console. Transitions between the screen and the indicator console are covered by a face plate. The face plate mostly comprises further design elements, for example a chrome strip or the like. In order to avoid irritating noise development in the motor vehicle because of the instrument panel in particular while the motor vehicle is being driven, damping elements, at least between the face plate and the screen, mostly made or rubber or another damping material are arranged. These are arranged between face plate and screen, so that these are concealed by the face plate. Here, the damping elements are arranged so that these press onto the screen, i.e., exert a force approximately in normal direction onto the screen.

From DE 198 59 919 A1 an indicating instrument for a motor vehicle is known, with a housing having a front frame holding a covering screen and an elastic spacer element arranged between covering screen and front frame and a method for connecting the covering screen to the front frame. In order to ensure a clearance free and secure connection between covering screen and front frame, the solution provides that the spacer element is placed in an axial recess arranged in the region of the circumference of the front frame and facing the covering screen, into which the covering screen can engage. The method consists in that in a first step the spacer element is introduced into the axial recess of the front frame and in that in a second step the covering screen is pressed into the axial recess against the spacer element.

In view of the foregoing, at least one object is to create an improved screen unit, an improved face plate unit, an improved indicator instrument, an improved indicator device and a motor vehicle as well as a method thereto, which make possible a narrower and smaller construction. In addition, other objects, desirable features, and characteristics will become apparent from the subsequent summary and detailed description, and the appended claims, taken in conjunction with the accompanying drawings and this background.

SUMMARY

A screen unit is provided for an indicator device for a motor vehicle, in particular for a cockpit of a passenger car, for covering various indicators, which comprises a rim defining an outer contour of the screen unit. It is provided that the screen unit on the rim comprises at least one attached support extension for supporting damping elements. The screen unit is preferably designed in one part. In an embodiment, the screen unit is designed in multiple parts. In particular, the screen unit is designed unchangeable. In an embodiment, the screen unit is variable, in particular designed displaceable or adjustable. The screen unit is preferably formed as an unchangeable, one-part screen. The screen is designed transparent.

In an embodiment, the screen is at least partially tinted or designed differently with respect to the transparency. The screen comprises a rim. This defines the outer contour or the shape of the screen in lateral direction. In an embodiment, the screen is curved or designed bent at least in sections. In another embodiment, the screen is designed flat at least in sections. The screen forms a screen plane, which is correspondingly curved, partially flat or plain or designed concavely and/or convexly curved. In an embodiment, the screen comprises optical elements such as lenses, finned material, thickened material, material recesses and the like. These optical elements are formed integrated in an embodiment.

Preferably, the screen comprises at least one support extension. Preferably, the screen comprises a plurality of support extensions spaced from one another along its rim. Preferably, a support extension is formed as a lobe-like extension, laterally extending from the screen plane. This lobe-like extension preferably has a rounded, circular, semi-circular, triangular, square, polygonal and/or any other desired shape in a top view. The support extension is preferably formed in one part with the screen. In an embodiment, the extension is formed laterally on the edge of the screen. The support extension in an embodiment extends at least in sections as extension of the screen plane. In another embodiment, the support extension runs in lateral direction transversely at least in sections, i.e., at an angle to the screen plane.

In an embodiment it is provided that at least one of the support extensions is arranged at least partially offset to a screen plane defined by the screen unit. The support extensions can be designed differently to one another. In particular, the support extensions are designed differently with respect to their lateral extension, so that these for example face into different directions. The shape of the support extensions is preferably designed the same. In a preferred way, at least one of the support extensions is designed at an angle to the screen plane, i.e., the support extension comprises at least two extension portions, which run in different directions. Preferably, a portion, with which the support continuation is connected to the screen, runs transversely to a screen plane, in particular at an angle approximately >=30°, preferably at a right angle. A second portion, which follows the first portion, runs transversely to the first portion. In particular, the second portion runs approximately parallel to the screen plane. Because of the first portion, an offset transversely to the screen plane is thus created.

A face plate unit or an indicator device is provided for a motor vehicle, in particular for a cockpit of a passenger car, for concealing an edge of the screen unit defining an outer contour of a screen unit, which comprises at least one fastening portion for a damping element for abutting the screen unit. The face plate unit comprises an inner portion assigned to the screen unit, it is provided that the fastening portion is designed offset to the inner portion, so that the damping elements can be attached at least partially outside the inner portion. The face plate unit runs along an outer contour of the screen unit or the screen or along the edge of the latter.

The face plate unit is preferably designed as a plastic part. This comprises an inner edge in a cross section, which on abutting the screen forms a hollow space surrounded by two supporting portions, the inner portion. In order to realize the face plate unit less voluminous and thus smaller in construction, the fastening portion for the damping element is moved out of this inner portion so that the damping element now no longer has to be arranged in the inner portion. Thus, the inner portion has flank portions running more steeply, which delimit a narrower or smaller hollow space.

An embodiment provides that the fastening portion comprises a pin-like projection, onto which a damping element can be fitted and/or secured. The fastening portion preferably runs in the direction of the screen, i.e. in a normal direction of the screen, i.e., approximately at a right angle to the screen plane. Accordingly, another embodiment provides that the fastening portion is arranged outside the inner portion, in particular on a transition region from the inner portion to an adjoining portion and/or in the adjoining portion. In an embodiment, the fastening portion, i.e., the pin-like projection is formed approximately in extension, with respect to a flank of the inner portion or extends from this region. In another embodiment, the pin-like projection is formed on an adjacent flank or an adjacent hollow space. The inner portion is the portion of the face plate or the face plate unit, which is formed within or above the screen along its edge. The fastening portion is moved from the inner portion into a region, which projects over the edge and/or at least partially protrudes over the support extension. Through the moving of the fastening portion away from the inner portion, more space for accommodating the fastening portion or the damping element to be provided there is created. The fastening portion can, for example, be also realized through pins or the like which are curved, bent and/or formed of a plurality of portions.

Furthermore, an indicator instrument is provided for indicating a drive characteristic of a motor vehicle for an arrangement in an indicator console, in particular for a cockpit of a passenger motor car, comprising an indicator unit and a housing receiving the indicator unit it is provided that the housing comprises at least one attached support extension for supporting damping elements. The indicator instrument is designed as any indicator instrument, for example a fuel gauge, a speedometer, a tachometer, a multi-function display, an oil temperature gauge and the like. Here, the indicator unit is designed as an analogue and/or electronic indicator.

The indicator in particular comprises a mechanical connection such as a speedometer shaft or the like. Preferably, the indicator instrument is designed as a tube. Here, the indicator instrument comprises an indicator unit or a display, from which an observer can read a drive characteristic. The indicator unit is arranged in a housing which is preferably designed as a cylinder tube with a circular or oval cross section. This so-called tube is received in a corresponding receptacle of an indicator console. The receptacle of the indicator console is preferably designed complementarily to the tube.

In an embodiment it is provided that the support extension at least partially extends laterally through an indicator plane defined by the indicator unit. Preferably, the support extension is arranged on an edge of the housing that is arranged adjacent to the indicator instrument. Preferably, the screen along its edge comprises a plurality of support extensions which are spaced from one another. Preferably, a support extension is designed as a lobe-like extension extending laterally from the screen plane. This extension has a preferably rounded, circular, semi-circular, triangular, square, polygonal and/or any other shape in a top view. The support extension is preferably formed as one part with the housing. In an embodiment, the extension is formed laterally on the edge of the housing. The support extension in an embodiment extends at least in sections in extension of an indicator plane. In another embodiment, the support extension runs in lateral direction transversely at least in sections, i.e. at an angle to the indicator plane. In an embodiment, the support extension runs offset in parallel with the indicator plane.

In addition, an indicator device is provided for a motor vehicle, in particular for a cockpit of a passenger motor car, comprising at least one screen unit covering different indicator instruments and a face plate unit concealing an edge of the screen unit. Damping elements are provided on the face plate unit, in particular damping elements contacting the screen unit, it is provided that the screen unit is designed as a screen unit described above and/or the face plate unit is designed as a face plate unit described above and/or as indicator instruments described above. With its inner portion, the face plate unit is supported over or on the screen. A region designed adjacent to the inner portion, the face plate unit or face plate projects over the edge of the screen unit or screen.

In the process, support extensions laterally project away from the edge of the screen and/or of the indicator instrument. These support extensions are at least partly covered by the adjacent portion, an outer portion of the face plate unit. In or on the outer portion is located a fastening portion for fastening damping elements to the face plate. The damping elements are designed approximately thimble-like. Here, the damping elements are fitted onto the pin-like fastening portions, so that these extend in the direction of the screen and/or indicator instruments or support extension arranged thereon.

In the assembled state of the indicator device, the damping elements preferably press against the extensions and/or the screen with a preload force. In this way, a contact between screen and a circumferential edge of the face plate is at least partially prevented so that because of this no interfering noise development occurs. Accordingly, the fastening portions and the support extensions are oriented matching one another.

In a preferred embodiment, the support extensions are designed offset from the screen plane and/or the indicator plane. The damping elements are fastened in such a manner that these are supported by the support extensions next to the edge of the screen. In this way, upon suitable arrangement, a clamping force or lateral force for example can be applied onto the edge of the screen in addition to a normal force on the support extensions.

Accordingly it is provided in an embodiment that on the face plate unit damping elements are arranged, of which at least one is supported by an associated support extension next to the edge of the screen unit, in order to thus bring about a damping between screen unit and face plate unit. Because of this arrangement, a smaller construction solution is realized. In particular, a frame of the face plate unit is constructed narrower, i.e., with steeper running flanks, which laterally delimit the portions of the face plate unit.

In a further embodiment it is provided that an indicator console receiving and/or comprising the indicators (instruments). The indictor console on the one hand is designed as a housing for the indicators or indicator instruments. On the other hand, the indicator console realizes a fastening possibility for the screen unit and/or the face plate unit. When assembled with the screen unit and/or the face plate unit, the entire arrangement, i.e., the indicator device is also called a cluster. In particular, the screen unit is clipped together with the indicator console.

In another embodiment, the screen unit is welded to the indicator console. Altogether, different connecting possibilities can be realized. Furthermore, the face plate unit is clipped together with the indicator console in an embodiment. Here, the damping elements are pressed onto the screen or the support extensions under preload.

According to yet a further embodiment it is provided that the screen unit and/or the face plate unit and/or the indicator instruments comprise connecting units for connecting to the indicator console in order to secure the screen unit and/or the face plate unit and/or the indicator instruments on the indicator console. The connecting units project from the screen unit, the indicator instrument or the face plate unit in the direction of the indicator console. Preferably, the connecting units are designed as clip units. These are connected to the indicator console or the clip counterparts of the latter or otherwise, for example in a materially jointed manner through welding or the like.

A motor vehicle is also provided, in particular a passenger motor car, comprising at least one instrument panel it is provided that the at least one instrument panel is designed as an indicator device as described above. The vehicle is for example a sedan, kombi vehicle, off-road vehicle, minibus, van, minivan, SUV or the like. These have a corresponding cockpit. In said cockpit, the indicator device is integrated in a technically safe, ergonomical and/or design optimized manner.

In addition, a method for the assembly and/or production of an instrument panel for a motor vehicle, in particular of an instrument panel for a cockpit of a passenger motor car designed as an indicator device as described above, in the case of which damping elements are provided, it is provided that at least one of the damping elements is arranged for being supported by one of the support extensions next to the edge of the screen unit. The damping elements are attached to the fastening portion of the face plate unit. The screen is clipped together with the indicator console. The face plate is kept together with the indicator console. In the process, the damping elements fixed to the face plate are pressed against the screen or the support extensions under preload.

BRIEF DESCRIPTION OF THE DRAWINGS

The present invention will hereinafter be described in conjunction with the following drawing figures, wherein like numerals denote like elements, and:

FIG. 1 is schematically, in a top view, an indicator device without indicator instruments;

FIG. 2 is schematically, in a top view, a detail of the indicator device according to FIG. 1 with indicator instruments without face plate unit;

FIG. 3 is schematically, in a perspective view, a detail of the indicator device according to FIG. 1 with two section lines;

FIG. 4 is schematically, in a perspective view, the section A-A according to FIG. 3;

FIG. 5 is schematically, in a perspective view, the section B-B according to FIG. 3;

FIG. 6 is schematically, in a perspective view, a detail of a motor vehicle with cockpit and indicator device arranged thereon;

FIG. 7 is schematically, in another perspective view, another detail of the motor vehicle with cockpit and indicator device arranged thereon;

FIG. 8 is schematically, in a top view, the indicator device with indicator instruments;

FIG. 9 is schematically, in a top view, the indicator device according to FIG. 8, without face plate unit;

FIG. 10 is schematically, in a perspective view, the indicator device with damping elements being supported by the screen unit;

FIG. 11 is schematically, in a perspective view, the indicator device with damping elements being supported by the indicator instrument;

FIG. 12 is schematically a cross section through the embodiment according to FIG. 11;

FIG. 13 is schematically, in a transversely sectioned detail view the arrangement of the damping elements on the support extension on the indicator instrument;

FIG. 14 is schematically a cross section through the embodiment according to FIG. 10;

FIG. 15 is schematically, in a transversely sectioned detail view the arrangement of the damping elements on the support extension on the screen unit;

FIG. 16 is schematically, another cross section (location B-B) through the embodiment according to FIG. 11;

FIG. 17 is schematically in a transversely sectioned detail view the arrangement of the damping elements on the support extension on the indicator instrument according to FIG. 16;

FIG. 18 is schematically, a cross section (location A-A) through the embodiment according to FIG. 10; and FIG. 19 is schematically, in a transversely sectioned detail view, the arrangement of the damping elements on the support extension on the screen unit according to FIG. 18.

DETAILED DESCRIPTION

The following detailed description is merely exemplary in nature and is not intended to limit application and uses. Furthermore, there is no intention to be bound by any theory presented in the preceding background or summary or the following detailed description.

FIG. 1 to FIG. 19 show different exemplary embodiments of an indicator device 100 of a cockpit 5 of a motor vehicle 1 in different views and different degrees of detail. The indicator device 100 comprises an indicator console 20, on which a plurality of indicator instruments 110, a screen unit 40, screen in brief, and a face plate unit 60, face plate in brief, are arranged. The screen unit 40 has an edge 42, which defines the outer contour of the screen 40. The edge 42 is concealed by the face plate 60 running along the edge 42. For this purpose, the face plate unit 60 has a corresponding circumferential portion 62.

For defining view windows 43, 44, the portion 62 to a beholder is designed with different widths and for sub-dividing view windows 43, 44, comprises an inner frame or an additional passage opening 64. The face plate 60 or its portion 62 form a large view window 44, which in the top view approximately the contour of two laterally spaced circles, which are connected via two parallel horizontals with a spacing that is smaller than the diameter of the circles. The inner frame 64 together with the outer portion 62 defines the smaller view window 43, which is formed approximately above the upper horizontal.

The frame of complex design is preferably formed as a plastic part. Facing a beholder, an ornament 80, for example a chrome strip or the like is attached on the portion 62 respectively on the inner frame/passage opening 64. On the face plate 60, damping elements 30 are attached, which in the assembled state are preloaded against the support extensions 50. In an embodiment, lobe-like support extensions 50 are formed on the edge 42 of the screen 40. These project away from the screen 40 in lateral direction. In another embodiment, lobe-like support extensions 50 are formed on the indicator instrument 110.

The support extensions 50 are formed for supporting the damping elements 30. The damping elements 30 are arranged in corresponding fastening portions 69 on the side facing away from the beholder. Here, the fastening portions 69 are arranged outside an inner portion 67 of the circumferential portion 62, so that the face plate 60 is formed of a narrow design with relatively steeply running flanks 67a, 68a. A detailed description follows in connection with the individual figures. Same or similar components are marked with the same reference characters. Components already described are not extensively described again for the sake of clarity.

FIG. 1 schematically shows the indicator device 100 without indicator instruments 110 in a top view. The indicator device 100 is shown in the assembled state, in which the face plate 60 conceals the edge 42 of the screen 40. Both the face plate 60 as well as the screen 40 is connected to the indicator console 20, in this case by way of a clip-on connection which is not shown in more detail. Between the face plate 60 and the indicator console 20, damping elements 30 are provided, which press against the screen 40 with preload. In the process, some damping elements 30 press against the screen 40 within the screen region defined by the edge 42. Other damping elements 30 laterally press against support extensions 50 protruding on the edge.

FIG. 2 schematically shows a detail of the indicator device 100 according to FIG. 1 with indicator instruments 110 without face plate unit 60 in a top view. Here, the lobe-like support extensions 50 which are formed on the edge 42 of the screen 40, on which the damping elements 30 are supported are clearly visible.

FIG. 3 schematically shows a detail of the indicator device 100 according to FIG. 1 with two section lines in a perspective view. The section line A-A runs through the face plate 60 next to a support extension 50. The section line B-B runs through the face plate 60 through a support extension 50.

FIG. 4 schematically shows the section A-A according to FIG. 3 in a perspective view. On the inner portion 67 of the face plate unit 60, a pin-like fastening portion 69, here in the form of a pin-like projection, is attached outside the inner portion 67 at a transition of a flank 67a to a further adjacent flank 68a of an outer region 68. On the fastening portion 69, a damping element 30 which is formed thimble-like is attached. This damping element 30 is supported by a support extension 50 of the screen 40 which is shown more clearly in FIG. 5. A further damping element 30 is supported on the screen 40 itself at another location (not explicitly shown here). In addition, the further course of the face plate 60 is shown for example as a saddle-like frame and the indicator console 20 with an exemplary indicator instrument or an indicator 110 in brief. Through the steeper flanks 67a, 68a a width D of the inner portion 67 of the face plate 60 is designed narrower than in the case of an arrangement of a damping element 30 within the inner portion 67.

FIG. 5 schematically shows the section B-B according to FIG. 3 in a perspective view. The moulding of the support extension 50 and the arrangement of the damping elements 30 on the support extension 50 is clearly shown here. Laterally of the screen 40, the support extension 50 projects offset from the screen plane defined by the screen 40. Here, the support extension 50 has a first portion 51 adjacent to the edge 42 of the screen 40. This initially extends in extension of the screen plane and thereafter turns approximately at an angle of approximately 90° and runs transversely to the screen plane. This angular first portion 51 is followed by a second portion 52, which runs angularly to the first portion 51 and runs approximately parallel to the screen plane. The damping element 30 is supported by this second portion 52. Here, the damping element 30 in this embodiment is arranged spaced from the first portion 51 and thus from the edge 42 of the screen. The fastening portion 69 is arranged outside the inner portion 67 of the face plate 60, so that the width D of the inner portion 67 and thus a width of the entire face plate 60 is designed significantly narrower.

FIG. 6 schematically shows a detail of a motor vehicle 1 with cockpit 5 and indicator device 100 arranged thereon in a perspective view. FIG. 7 schematically shows another detail of the motor vehicle 1 with cockpit 5 and indicator device 100 arranged thereon in another perspective view. The indicator device 100 is adapted to the cockpit in an ergonomical, technically safe and designed manned manner. The indicator instruments 110 are arranged clearly visible to a beholder. The face plate unit ensures that the edge 42 of the screen 40 is not visible to the beholder.

FIG. 8 schematically shows the indicator device 100 with indicator instruments 110 in a top view. In the shown embodiment, a tachometer is provided on the left. A speedometer is arranged on the right. In the middle top left, a fuel gauge is arranged. An oil temperature gauge is provided in the middle top right a. In the middle bottom, a display for an on-board computer, navigation system or the like is arranged.

FIG. 9 schematically shows the indicator device 100 according to FIG. 8 without face plate unit 60 in a top view. Therefore, the support extensions 50 laterally projecting next to the edge 42 of the screen 40, on which the damping elements 30 are supported. In the shown embodiment, support extensions 50 are formed on a housing 112 of the respective indicator instrument 110.

FIG. 10 schematically shows the indicator device 100 with damping elements 30 supported by the screen unit 40 in a perceptive view. The support extensions 50 are formed in one piece with the screen 40 and laterally project from its edge offset from a screen plane SE defined by the screen. On the corresponding support extensions 50, damping elements 30 are arranged. The face plate unit 60 is not shown for the sake of better representability. Furthermore, different connecting units 120 are shown, with which the screen unit 40 respectively the indicator console 20 or the entire indicator device 100 can be connected to adjacent components.

FIG. 11 schematically shows the indicator device 100 with damping elements 30 supported by the indicator instrument 110 in a perspective view. Substantially, the exemplary embodiment according to FIG. 11 is similar to that according to FIG. 10. The substantial difference is that the support extensions 50 are not formed on the screen unit 40 but on the respective indicator instrument 110. To this end, the indicator instrument 110 comprises the indicator housing or briefly called housing 112 in addition to an indicator unit 111 for showing drive characteristics. The housing 112 is for example designed integrated in the indicator console 20 or separately. With respect to their depth, the support extensions 50 of the housing 112 are dimensioned larger than the support extensions 50 of the screen 40. Here, too, at least some of the damping elements 30 are supported laterally next to the edge 42. Accordingly, the support extensions 50 laterally project over the edge 42.

FIG. 12 schematically shows a cross section through the embodiment according to FIG. 11. A frame 21 of the indicator console 20 is formed for connecting to the face plate unit 60. In a connecting region 22, the face plate unit 60 is connected to the indicator console, for example by way of a clip-on connection. The inner portion 67 of the face plate 60 does not have any damping element 30 or the fastening region 69. Instead, the fastening region 69 and the damping element 30 are arranged offset in a transition region outside the inner portion 67. In this way, the inner portion 67 can for example be designed more steeply through steeper flanks 67a, 68a. In an upper portion of the indicator device 100, the support extensions 50 are formed in one piece with the screen 40. Here, the support extensions 50 laterally project over the edge 42 of the screen 40, so that the damping elements 30 are correspondingly arranged with respect to the corresponding support extension 50 by which they can be supported. In a lower portion, the support extensions 50 are formed in one piece with the housing 112 of the indicator instruments 110.

FIG. 13 schematically shows the arrangement of the damping elements 30 on the support extension 50 on the indicator instrument 110 in a transversely sectioned detail view. It is clearly evident that the pin-like fastening region 69 is arranged outside the inner portion 67 and the damping element 30 arranged thereon accordingly is located outside the inner portion 67. The edge 42 of the screen 40 comprises a deflection or flange, by which the screen is likewise supported on the support extension 50. The damping element 30 with the fastening region 69 is designed so that the face plate 60 does not come into contact with the screen 40, so that no irritating noises are generated here.

FIG. 14 schematically shows a cross section through the embodiment according to FIG. 10. In this embodiment, the support extension 50 is formed in one piece with the screen 40 in the lower region of the indicator device 100. Here, the support extension 50 is arranged offset from the screen plane SE. With the edge 42, the screen is supported by the housing 112. In an upper portion, the damping element 30 located outside the inner portion 69 is supported by the indicator console 20. The lower region is more clearly shown in FIG. 15.

FIG. 15 schematically shows the arrangement of the damping elements 30 on the support extension 50 on the screen unit 40 in a transversely sectioned detail view. The support extension 50 follows the edge of the screen 40 where it forms a shoulder. The damping element 30 arranged on the fastening region 69 is supported on this shoulder so that the face plate 60 and the screen 40 do not create any irritating noises.

FIG. 16 schematically shows another cross section (location B-B) through the embodiment according to FIG. 11. FIG. 17 schematically shows the arrangement of the damping elements on the support extension 50 on the indicator instrument 110 according to FIG. 16 in a transversely sectioned detail view. As already described above, the support extension 50 is formed integrated in the indicator housing 112, here. Both the edge 42 of the screen 40 and the damping element 30, which is fastened by way of the fastening region 69 of the face plate unit 60 to the inner portion 67 of the latter.

FIG. 18 schematically shows a cross section (location A-A) through the embodiment according to FIG. 10 and FIG. 19 schematically shows the arrangement of the damping elements 30 on the support extension 50 on the screen unit 40 according to FIG. 18 in a transversely sectioned detail view. As already described above, the support extension 50 in this case is designed integrated in the screen unit 40. The edge 42 of the screen 40 is supported by the housing 112. The damping element 30, which via the fastening region 69 of the face plate unit 60 is fastened to the latter outside its inner portion 67, is supported by the support extension 50 on the screen 40 next to the edge 42 of the latter.

In summary the following can be noted that the embodiments relate to a motor vehicle 1 with an indicator device 100 as well as a method for its assembly and/or production. The indicator device 100 comprises an indicator instrument 110, a face plate unit 60 and a screen unit 40. The screen unit 40 for covering the front indicators 110 that has an outer contour of the indicator instrument 110 on laterally projecting support extensions 50 for supporting damping elements 30. The face plate unit 60 comprises an inner portion 67 assigned to the screen unit 40 with a fastening portion 69, wherein the fastening portion 69 is designed offset from an inner portion 67. The damping elements 30 are placed onto the support extensions 50.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An indicator device of a motor vehicle, comprising:
an indicator instrument for displaying instrument information in an indicator console, comprising an indicator unit for displaying instrument information; and
a housing receiving the indicator unit, the housing comprising:
a plurality of support extensions protruding from an edge of the housing, the plurality of support extensions extending at least partially laterally to an indicator plane defined by the indicator unit;
a plurality of substantially thimble shaped damping elements, each of the plurality of substantially thimble shaped dampening elements supported by one of the plurality of support extensions; and
a screen configured to cover the indicator instrument, the screen having an edge supported on the support extension separately from the plurality of substantially thimble shaped dampening elements.

* * * * *